United States Patent [19]
Keogh

[11] Patent Number: 6,127,482
[45] Date of Patent: Oct. 3, 2000

[54] CROSSLINKABLE POLYETHYLENE COMPOSITION

[75] Inventor: Michael John Keogh, Pinehurst, N.C.

[73] Assignee: Union Carbide Chemicals & Plastics Technology Corporation, Danbury, Conn.

[21] Appl. No.: 09/282,491

[22] Filed: Mar. 31, 1999

[51] Int. Cl.⁷ .............................. C08K 5/25; C08K 5/06; C08G 63/48; C08G 63/91
[52] U.S. Cl. ............................ 525/107; 524/367; 525/70; 525/74; 525/75; 525/191; 525/192; 525/194; 525/203; 525/221; 525/222; 525/231; 525/232; 525/236; 525/237; 525/240; 174/110 R; 174/121 SR; 425/500; 425/505
[58] Field of Search ...................................... 524/107, 367; 525/70, 74, 75, 191, 192, 194, 206, 221, 222, 231, 232, 236, 237, 240; 174/110 R, 121 SR; 425/500, 505

[56] References Cited

U.S. PATENT DOCUMENTS 5,539,075   7/1996   Gustafsson et al. .................... 526/339

*Primary Examiner*—Nathan M. Nutter
*Attorney, Agent, or Firm*—Saul R. Bresch

[57] ABSTRACT

A composition comprising:
(a) polyethylene;
(b) a cure booster selected from the group consisting of 3,9-divinyl-2,4,8,10-tetra-oxaspiro[5.5]undecane (DVS); a copolymer of ethylene and DVS; and an ethylene homopolymer or copolymer having DVS grafted thereto; and
(c) an organic peroxide.

9 Claims, No Drawings

CROSSLINKABLE POLYETHYLENE COMPOSITION

TECHNICAL FIELD

This invention relates to compositions useful in the preparation of cable insulation, semiconducting shields, and jackets.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

In many cases, crosslinking of the polymeric materials is essential to the particular cable application, and, in order to accomplish this, useful compositions generally include a polymer; a crosslinking agent, usually an organic peroxide; and antioxidants, and, optionally, various other additives such as a scorch inhibitor or retardant and a crosslinking booster. Crosslinking assists the polymer in meeting mechanical and physical requirements such as improved thermal aging and lower deformation under pressure.

The crosslinking of polymers with free radical initiators such as organic peroxides is well known. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which lead to crosslinking of the polymer.

Polymers containing peroxides are vulnerable to scorch (premature crosslinking occurring during the extrusion process). Scorch causes the formation of discolored gel-like particles in the resin. Further, to achieve a high crosslink density, high levels of organic peroxide have been used. This leads to a problem known as sweat-out, which has a negative effect on the extrusion process and the cable product. Sweat-out dust is an explosion hazard, may foul filters, and can cause slippage and instability in the extrusion process. The cable product exposed to sweat-out may have surface irregularities such as lumps and pimples and voids may form in the insulation layer.

Industry is constantly seeking to find crosslinkable polyethylene compositions, which can be extruded at high temperatures (although limited by the decomposition temperature of the organic peroxide) and rates with a minimum of scorch and yet be crosslinked at a fast cure rate to a high crosslink density, all with essentially no sweat out., i.e., crystallization of the organic peroxide on the surface of the extrudate.

In U.S. Pat. No. 5,539,075, it is found that a copolymer of ethylene and a diene having at least 8 carbon atoms produced with radical polymerization under high pressure conditions has a high level of unsaturation and is particularly useful for crosslinking in the presence of peroxides. This reactivity can lead to processing problems and restrict the universal use of this copolymer. Thus, industry is seeking less restrictive compounds and/or polymers as a substitute for this copolymer in compositions adapted for cable applications.

DISCLOSURE OF THE INVENTION

An object of this invention, therefore, is to provide a crosslinkable polyethylene composition, which includes a crosslinking promoter, which is more effective; less restrictive with respect to processing; and lowers significantly the requirement for peroxide thus reducing sweatout and the hazard associated therewith. Other objects and advantages will become apparent hereinafter.

According to the invention, such a composition has been discovered. The composition comprises:

(a) polyethylene;

(b) a cure booster selected from the group consisting of 3,9-divinyl-2,4,8,10-tetra-oxaspiro[5.5]undecane (DVS); a copolymer of ethylene and DVS; and an ethylene homopolymer or copolymer having DVS grafted thereto; and (c) an organic peroxide.

DESCRIPTION OF THE PREFERRED EMBODIMENT(S)

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.8 to 0.950 gram per cubic centimeter, and preferably have a density in the range of 0.870 to about 0.930 gram per cubic centimeter. They also can have a melt index in the range of about 0.1 to about 50 grams per 10 minutes.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,5≡(heterogeneous polyethylenes); vanadium based catalyst systems such as those described in U.S. Pat. Nos. 4,508,842 (heterogeneous polyethylenes) and 5,332,793; 5,342,907; and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), and high density polyethylene (HDPE) having a density greater than 0.940 gram per cubic centimeter. The latter four polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C.

The density of the high pressure, low density homopolymer of ethylene can be in the range of 0.915 to 0.930 gram per cubic centimeter, and the melt index can be in the range of about 0.2 to about 20 grams per 10 minutes. Melt index is determined under ASTM D-1238, Condition E, at 190 degrees C. and 2.16 kilograms.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms, The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. The melt index is determined in accordance with ASTM D-1238, Condition E, measured at 190 degrees C. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices.

The cure booster can be selected from the group consisting of 3,9-divinyl-2,4,8,10-tetra-oxaspiro[5.5]undecane (DVS); a copolymer of ethylene and DVS; and an ethylene homopolymer or copolymer having DVS grafted thereto. The copolymer of ethylene and DVS can be made by conventional low pressure or high pressure techniques, both of which have been referred to above with respect to the general description of polyethylene. A high pressure process is also described in U.S. Pat. No. 5,539,075.

The grafting of DVS to a homopolymer or copolymer of ethylene is also conventional., and can be accomplished using the organic peroxides, i.e., free radical generators, mentioned below. In an extruder or other reaction vessel, the organic peroxide catalyst can be added to the polyolefin together with the DVS. Grafting temperatures can be in the range of about 100 to about 300 degrees C. and are preferably in the range of abut 150 to about 200 degrees C. A typical procedure for grafting is described in U.S. Pat. No. 4,506,056. Grafting can also be accomplished by adding a solution of DVS, an organic peroxide catalyst, and an organic solvent to the polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and DVS, and which strip off well under appropriate devolatilization conditions may be used. Acetone is a preferred solvent because it acts as a stripping agent for residuals.

The organic peroxide preferably has a one hour half life decomposition temperature measured in benzene of about 125 to about 150 degrees C. and can be exemplified by the following compounds [the numbers set off by the parentheses are their one hour half life decomposition temperatures (in degrees C.)]: t-butyl peroxy benzoate (125); dicumyl peroxide (135); alpha, alpha'-bis-t-butylperoxy-1,4-diisopropylbenzene (137); 2,5-dimethyl-2,5-di(t-butyl-peroxy)hexane (138); t-butyl cumyl peroxide (138); t-butyl hydroperoxide (140); di-t-butyl peroxide (149); and 2,5-dimethyl-2,5-di(t-butyl peroxy)hexane-3 (149). Alpha, alpha'-bis-t-butylperoxy-1,4-diisopropylbenzene is preferred.

Based on 100 parts by weight of the polyethylene, the proportions of the compounds can be about as follows (in parts by weight):

| Component | Broad Range | Preferred Range |
|---|---|---|
| (b) cure booster | 0.1 to 1.5 | 0.2 to 1 |
| (c) organic peroxide | 0.3 to 3 | 0.5 to 1.5 |

It should be understood that these proportions can vary outside of the stated ranges depending on the desired properties. For example, to achieve a low dissipation factor in wire and cable applications, the amount of cure booster can be lowered and the amount of peroxide raised. Variations can also be considered for other properties such as heat aging characteristics and tensile properties.

The composition of the invention can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 130 to about 2 degrees C., and preferably in the range of about 170 to about 220 degrees C.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valves maintain equilibrium of the steam and water and the respective fill lengths within the steam CV tube. Hot inert gases such as nitrogen can be used as an alternative to steam for heating.

Conventional additives can be added to the polymer either before or during processing. The amount of additive is usually in the range of about 0.01 to about 50 percent by weight based on the weight of the resin. Useful additives are antioxidants, ultraviolet absorbers, antistatic agents, pigments, carbon black, dyes, fillers, slip agents, scorch inhibitors, fire retardants, plasticizers, processing aids, lubricants, stabilizers, smoke inhibitors, halogen scavengers, flow aids, lubricants, water tree inhibitors such as polyethylene glycol, and viscosity control agents.

In order to provide a semiconducting shield it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, N110, and acetylene black.

Examples of antioxidants are: hindered phenols such as tetrakis[methylene(3,5-di-tert-butyl-4-hydroxyhydro cinnamate)]methane; bis [(beta-(3,5-ditert-butyl-4-hydroxybenzyl)-methylcarboxyethyl)]sulphide; 4,4'-thiobis (2-tert-butyl-5-methylphenol); 2,2'-thiobis(4-methyl-6-tert-butylphenol); and thiodiethylene bis(3,5-di-tert-butyl-4-hydroxy hydrocinnamate); phosphites and phosphonites such as tris(2,4-di-tert-butylphenyl)phosphite and di-tert-butylphenyl-phosphonite; thio compounds such as dilaurylthiodipropionate and dimyristylthiodipropionate; various siloxanes; and various amines such as polymerized 2,2,4- trimethyl-1,2-dihydroquinoline, 4,4'-bis(alpha, alpha-dimethylbenzyl)diphenylamine, and alkylated diphenylamines. Antioxidants can be used in amounts of about 0.1 to about 5 percent by weight based on the weight of the composition.

Advantages of the invention are high cure rate, high cure density, reduction in level of organic peroxide, higher useful extrusion temperatures, less molecular weight degradation of copolymer, less dusting of resin due to peroxide sweat out, and, under suitable circumstances, higher throughput of wire or cable through the continuous vulcanizing oven. The reduction in level of organic peroxide is especially important in processes in which the organic peroxide is soaked into the polymer composition because this also reduces the sweat out. Moreover, the faster rate of response to a given peroxide and the resulting higher crosslink density allows for the use of a peroxide with a higher decomposition onset temperature. This important advantage allows for higher extrusion temperature and rates, and the selection of a more stable peroxide reduces the extrusion process scorch while still maintaining the high cure rate. Thus, in effect, the higher decomposition temperature controls the scorch. Finally, the superior heat aging characteristics should be pointed out.

At least three methods exist for quantifying the degree of crosslinking of the resin: (i) by "hot-set". This is accomplished by attaching a weight to the crosslinked composition in plaque form at 200 degrees C. If the elongation is at least 100 percent, the crosslink density is sufficient for industrial purposes. (ii) by decalin extractables. The uncrosslinked polymer dissolves in the hot decalin solvent and the value is reported in percent by weight decalin extractables. A value below 30 percent, and preferably less than 20 percent, is judged to be acceptable. (iii) by rheometer, which checks the viscosity. The rheometer test procedure is described in U.S. Pat. No. 3,954,907. The first two methods are industry standards. The third method is a diagnostic tool particularly suitable for accurate screening and laboratory study.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

It is understood that the term "decomposition temperature" as it relates to organic peroxides is the onset temperature for significant decomposition of the organic peroxide. This temperature is based on the half life temperature of the organic peroxide.

All molecular weights mentioned in this specification are weight average molecular weights unless otherwise designated.

The patents mentioned in this specification are incorporated by reference herein.

The invention is illustrated by the following examples.

EXAMPLES 1 to 14

100 parts by weight of the ethylene polymer are fluxed in a Brabender™ mixer heated to 150 degrees C. The additives are added to the fluxed resin and mixed at a temperature of up to about 170 degrees C. during a five minute period. The resulting composition is cooled and transferred to a heated two roll mill where the peroxide is added and blended at a temperature below 130 degrees C. for three minutes. The hot sheeted peroxide composition is then fed to a granulator to provide a granulated product for use in the examples. Variables and results are set forth in the Table. Amounts of components are given in parts by weight.

TABLE

| Example | 1 | 2 | 3 | 4 | |
|---|---|---|---|---|---|
| HP-LDPE | 100 | 100 | 100 | 100 | |
| A/O I | 0.2 | — | 0.2 | 0.2 | |
| A/O II | — | 0.2 | — | — | |
| A/O III | 0.2 | 0.2 | 0.2 | 0.2 | |
| 1,9-decadiene | — | — | 0.5 | — | |
| 1,13-tetradecene | — | — | — | 0.5 | |
| DVS | — | — | — | — | |
| dicumyl peroxide | 1.7 | 1.7 | 1.7 | 1.7 | |
| Tests | | | | | |
| rheometer (lbs-inches) | 43 | 38 | 48 | 49 | |
| Example | 5 | 6 | 7 | 8 | 9 |
| HP-LDPE | 100 | 100 | 100 | 100 | 100 |
| A/O I | 0.2 | 0.2 | 0.2 | — | — |
| A/O II | — | — | — | 0.2 | 0.2 |
| A/O III | 0.2 | 0.2 | 0.2 | 0.2 | 0.2 |
| 1,9-decadiene | — | 0.5 | — | — | — |
| DVS | 0.5 | — | 0.5 | — | 0.5 |
| dicumyl peroxide | 1.7 | 1.2 | 1.2 | 1.8 | 1.2 |
| Tests | | | | | |
| rheometer (lbs-inches) | 62 | 34 | 47 | — | — |
| sweatout (percent): | | | | | |
| peroxide (4 weeks) | — | — | — | 100 | 50 (50) |
| peroxide (8 weeks) | — | — | — | 100 | 29 (71) |
| A/O II (4 weeks) | — | — | — | 100 | 35 (65) |
| A/O II (8 weeks) | — | — | — | 100 | 43 (57) |
| Example | 10 | 11 | 12 | | |
| HP-LDPE | 100 | 100 | 100 | | |
| A/O I | 0.2 | 0.2 | 0.2 | | |
| A/O II | — | — | — | | |
| A/O III | 0.2 | 0.2 | 0.2 | | |
| 1,9-decadiene | 0.5 | — | — | | |
| DVS | — | 0.5 | — | | |
| TAC | — | — | 0.5 | | |
| dicumyl peroxide | 1.3 | 1.2 | 1.2 | | |
| Tests | | | | | |
| rheometer (lbs-inches) | 40 | 47 | 50 | | |
| percent retained at 4 weeks and 150 degrees C.: | | | | | |
| tensile strength | 27 | 78 | 26 | | |
| elongation | 5 | 86 | 3 | | |
| Example | 13 | 14 | | | |
| HP-LDPE | 100 | 100 | | | |
| A/O I | — | — | | | |
| A/O II | 0.2 | 0.2 | | | |
| A/O III | 0.2 | 0.2 | | | |
| 1,9-decadiene | 0.5 | — | | | |
| DVS | — | 0.5 | | | |

TABLE-continued

| | | |
|---|---|---|
| dicumyl peroxide | 1.4 | 1.3 |
| Tests | | |
| rheometer (lbs-inches) | 36 | 46 |
| percent retained at 4 weeks and 150 degrees C.: | | |
| tensile strength | 50 | 59 |
| elongation | 36 | 66 |

Notes to Table:
1. HP-LDPE is a high pressure, low density homopolymer of ethylene. It has a density of 0.92 gram per cubic centimeter and a melt index of 2.1 grams per 10 minutes.
2. A/O I is the antioxidant thiodiethylene bis(3,5-di-tert-butyl-4-hydroxy hydrocinnamate).
3. A/O II is the antioxidant 4,4'-thiobis(2-tert-butyl-5-methylphenol).
4. A/O III is the antioxidant distearylthiodipropionate.
5. TAC is triallylcyanurate.
6. DVS is 3,9-divinyl-2,4,8,10-tetra-oxaspiro[5.5]undecane.
7. Rheometer (lbs-inches) is measured in accordance with the test described in U.S. Pat. No. 3,954,907.
8. Sweatout (percent) is determined by aging pellets made up of the recited composition for 4 and 8 weeks, and after each period washing the pellets with methanol and determining the amount of peroxide and A/O II on the surface of the pellets with high pressure liquid chromatography (HPLC). Example 8 is a control and is arbitrarily assigned the value of 100 percent sweatout on the surface of the pellet. The percentages in example 9 represent the percentage of sweatout on the surface in contrast to the control of 100 percent. The parenthetical value is the percent reduction in sweatout based on the control.
9. Tensile strength and elongation are measured under ASTM D-412 with regard to percent retained after aging for 4 weeks at 150 degrees C.

What is claimed is:

1. A composition comprising:
   (a) polyethylene;
   (b) a cure booster selected from the group consisting of 3,9-divinyl-2,4,8,10-tetra-oxaspiro[5.5]undecane (DVS); a copolymer of ethylene and DVS; and an ethylene homopolymer or copolymer having DVS grafted thereto; and
   (c) an organic peroxide.

2. The composition defined in claim 1 wherein the cure booster is present in an amount of about 0.1 to about 1.5 parts by weight based on 100 parts by weight of the polyethylene.

3. The composition defined in claim 1 wherein the organic peroxide is present in an amount of about 0.3 to about 3 parts by weight based on 100 parts by weight of the polyethylene.

4. The composition defined in claim 1 wherein, for each 100 parts by weight of polyethylene, the other components are present as follows:
   (b) about 0.2 to about 1 part by weight of cure booster; and
   (c) about 0.5 to about 1.5 parts by weight of organic peroxide.

5. A cable comprising one or more electrical conductors or a core of electrical conductors, each conductor or core being surrounded by a composition comprising:
   (a) a crosslinked polyethylene; and
   (b) a cure booster selected from the group consisting of 3,9-divinyl-2,4,8,10-tetra-oxaspiro[5.5]undecane (DVS); a copolymer of ethylene and DVS; and an ethylene homopolymer or copolymer having DVS grafted thereto.

6. A process for extrusion comprising extruding around one or more electrical conductors or a core of electrical conductors, at a temperature below the decomposition temperature of the organic peroxide, a composition comprising
   (a) polyethylene;
   (b) a cure booster selected from the group consisting of 3,9-divinyl-2,4,8,10-tetra-oxaspiro[5.5]undecane (DVS); a copolymer of ethylene and DVS; and an ethylene homopolymer or copolymer having DVS grafted thereto; and
   (c) an organic peroxide, and curing the extrudate.

7. The composition defined in claim 6 wherein, for each 100 parts by weight of polyethylene, the other components are present as follows:
   (b) about 0.1 to about 1.5 part by weight of cure booster; and
   (c) about 0.3 to about 3 parts by weight of organic peroxide.

8. The composition defined in claim 1 wherein the organic peroxide is alpha, alpha'-bis-t-butylperoxy-1,4-diisopropylbenzene.

9. The composition defined in claim 6 wherein the organic peroxide is alpha, alpha'-bis-t-butylperoxy-1,4-diisopropylbenzene.

* * * * *